Nov. 25, 1952     C. T. COCKLIN     2,618,920

ROTATING CUTTING DISK TYPE MOWER

Filed Dec. 27, 1949

Inventor

Clinton T. Cocklin

By Arthur H. Sturges

Attorney

Patented Nov. 25, 1952

2,618,920

UNITED STATES PATENT OFFICE 2,618,920

ROTATING CUTTING DISK TYPE MOWER

Clinton T. Cocklin, Griswold, Iowa

Application December 27, 1949, Serial No. 135,201

1 Claim. (Cl. 56—255)

This invention relates to rotary lawn mowers and more particularly it is an object of the invention to provide improvement therein. It is well known that, as heretofore practiced in the art, cutters disposed at the ends of a rotary arm sometimes become detached from the arm and fly outwardly at a tangent to the rotation. This has been the cause of many serious accidents to the feet, ankles, and legs of operators or bystanders.

It is, therefore, an object of this invention to provide a cutter so constructed and so attached to the rotating carrier bar of the mower that when a cutter of this invention becomes detached from its carrier bar, the cutter falls to the ground, traveling a lesser distance than cutters of the prior art.

A further object of the invention resides in the provision of a rotary lawn mower having a hinged portion normally forwardly disposed of the rotating blade, the hinged portion being so constructed as to fold rearwardly, exposing the blade, whereby the latter can cut high weeds before the latter without their being first bent over by the forward end of the housing.

A particular object of the invention is to provide a cutting blade of a shape such that the rearward end thereof does not protrude outwardly of the swath of the forward cutting edge thereof.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
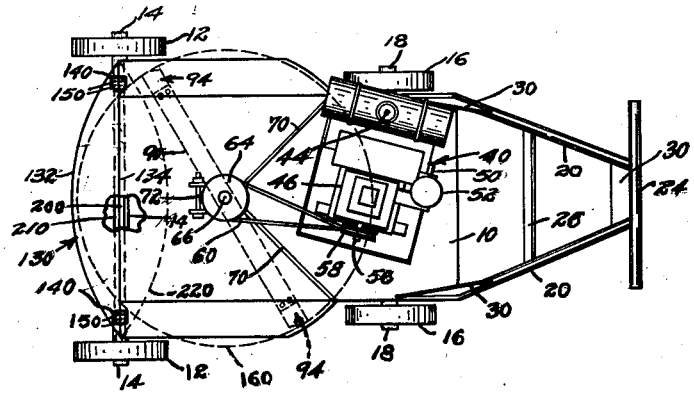
Figure 1 is a top plan view of a rotary mower, the rotary cutter bar thereof and its swath being shown in dotted lines. The hinged forward portion of the housing is shown in a down position for extending forwardly of the swath of the cutter bar.

Referring to Figure 1, the power mower of this invention includes a platform 10 supported by forward wheels 12 on an axle 14 and rearward wheels 16 on an axle 18. The platform 10 is guided by a handle having two inclinedly disposed side portions 20 which extend upwardly and rearwardly from the platform 10, being secured to a transverse handle portion 24. The members 20 are connected by a brace 26, and webs 30 are provided for purposes of strength.

Any suitable motor can be used, although a gasoline engine, generally indicated at 40, is illustrated here. The engine includes a gas tank 42 having a cap 44, a member 46 in which a cylinder is disposed, an exhaust pipe 50, and a muffler 52.

The motor 40 has a drive shaft 56 and a drive pulley 58, to which latter a driving belt 60 is attached. The driving belt 60 is disposed around a driven pulley 64 on a vertical shaft 66, which latter extends downwardly through the platform 10.

The shaft 66 is mounted in a bearing sleeve 68, held in place by vertically disposed bracing members 70, which latter are held together at their forward ends by a bolt 72.

Between the bottom of the platform 10 and the surface of the ground 80, a cutter bar 90 is disposed, and the latter is rigidly secured to the shaft 66. The bar 90 is elongated and is provided with cutting blades, generally indicated at 94, disposed one each on its ends. The blades constitute cutting elements.

Figure 3:
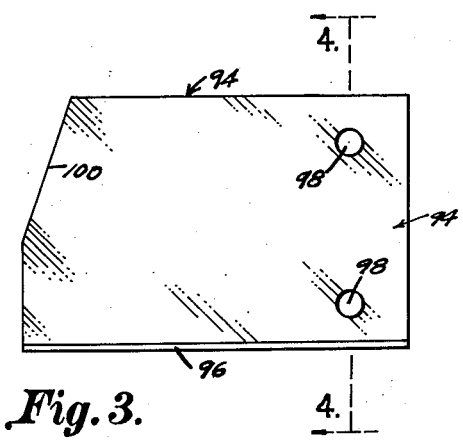
Figure 3 is an enlarged top plan view of a cutter blade of this invention.
Figure 4:
Figure 4 is a view-in-section of the cutter blade of Figure 3 the view being taken along the line 4—4.

The cutting blades 94 are each of substantially oblong rectangular shape in top plan view, having a sharpened cutting edge 96 on their forward or leading sides. The cutting blades 94 each have two bolt holes 98 extending therethrough, the holes 98 being disposed in a line preferably at a right angle with respect to the cutting edge 96, of each blade. The rearward outer corner of the substantially rectangular cutting blade 94, as shown in Figure 3, is cut away on a slant, as indicated at 100, since, if the corner at 100 were a right angle, it would tend to protrude outwardly of the swath of the cutting edge 96 causing weeds or the like to be bent before they are cut.

The outer ends of the cutter bar are provided with apertures therethrough disposed in pairs complemental to the apertures 98, whereby cutting edges 96 are disposed in parallelism with the cutter bar 90.

The cutting blades 94 are each secured to the ends of the cutter bar 90, respectively, by means of disposing through the cutter bar and blades the shanks of two bolt assemblies for each blade.

Figure 5:
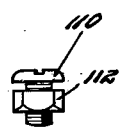
Figure 5 is an enlarged side elevation of a threaded shank assembly used for securing the blades to the cutter bar.

As best shown in Figure 5, an assembly includes a bolt having a head 110, the latter being slightly arcuate and provided with a flat top so that the head does not protrude beyond the surface of a blade 94 extensively during use. The assembly further includes a nut 112 threadedly secured to the shank of the bolt 110 for securing a body portion of a blade between the bolt head 110 and the nut 112.

As thus described it will be seen that each blade 94 is attached to its respective end of the bar 90 by means of two bolts and it will be understood that the shanks of the said two bolts, together have a combined strength and resistance to a shearing force which is proportional to the centrifugal force developed and applied to the blade resultant from rotation of the cutter bar at times when the latter is driven or rotated by the engine and adjunct mechanism. The inherent tensile strength of the blades and the cutter bar is sufficient to resist said centrifugal force for maintaining the blades in a fixed orbit during the rotation thereof.

The shearing strength of the two bolts of each blade is sufficient to substantially equal the degree of the said centrifugal force applied to the blades while the latter are rotating in their said fixed orbit, whereby at the time the edges of either one of the said two blades contacts with a solid obstruction, such as a stone or the like disposed upon the surface of the soil or a lawn, the resistance provided by said stone being sufficient to cause the bolts of the blade to shear, since the shearing strength of the bolts of each blade is substantially equal to the amount or degree of centrifugal force applied to the blades during their rotation, at the time of the shearing of the bolts the blade merely falls upon the lawn or soil by operation of gravity in lieu of moving outwardly with respect to its said normal fixed orbit by operation of said centrifugal force and at the time the blade becomes freed from the cutter bar resultant from the shearing of the bolts of a given blade.

At its forward end the platform 10 is provided with a forward portion or plate 130 which is provided with a convexially curved forward edge or arcuate depending flange 132 and a straight rearward edge 134, which latter is adapted to be disposed alongside the straight forward end of the platform 10, the said forward end of the platform 10 being disposed extending transversely of the mower between the wheels 12.

The forward portion 130 is secured to the platform 10 in any suitable manner, such as by means of hinges 140, which latter are disposed above the platform 10 and the platform forward extension 130 and are secured to the platform and its extension by means of suitable bolt pins 150, as best seen in Figure 1.

The forward edge of the platform 10 is provided with a downturned flange 200 which extends transversely of the platform 10. The rearward edge 134 of the extension 130 is similarly provided with a downturned flange 210, which latter is adapted to abut the flange 200 at times when the extension 130 is in a down position for preventing the extension 130 from interfering with the swath of the cutting bar 90 and its blades 94. It will be seen that when the extension 130 is in an up position, it is folded back and rests upon the top of the platform 10, as shown in dotted lines at 220 in Figures 1 and 2.

Figure 2:
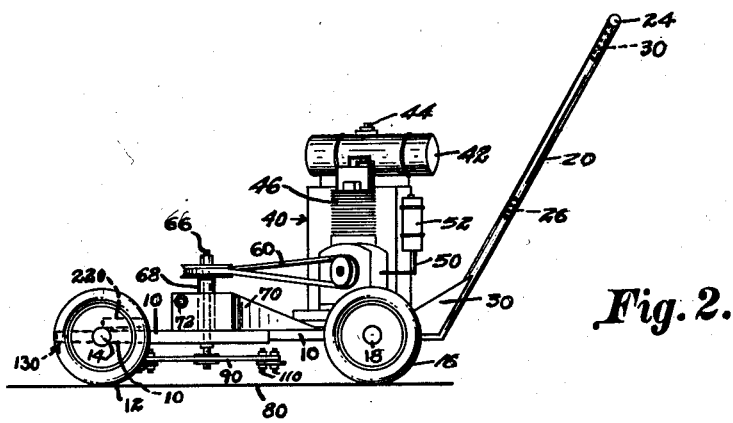
Figure 2 is a side elevation of the machine shown in Figure 1, the hinged forward portion of the Lousing being shown in an up position and partially showing in dotted lines.

It will be noted that when the platform extension 130 is in a down position, it extends forwardly of the swath 160 of the cutting blades 94. As best seen in Figure 2, it will be noted that the extension 130 can be pivoted rearwardly when desired for permitting the cutting blades 94 to cut high grasses and weeds, without the latter being bent down by the forward edge 132, as would obtain if the extension 130 were disposed in a down position.

As thus described, the extension 130 provides a safety feature since it will bump trees and the like before the blades 94 can strike them, although the shield or extension 130 can be pivoted rearward at any time the grasses or weeds are higher than the platform. The blades 94 will do the cutting before the weeds touch the platform.

In operation it will be seen that the shanks 110 and apertures 98 are so disposed that when a blade strikes a rock the bolts are both subjected to shearing forces simultaneously, whereby the particular method of attaching the blades 94 is such that the cutting blades fall downwardly at the time their respective bolts shear leaving the cutter bar and the remainder of the mower unharmed together with legs of adjacent persons. It will also be seen that the blades 94 will tend to fall to the ground more quickly, when sheared free, than do the blades of the prior art which move outwardly when free, by centrifugal force.

From the foregoing description it is thought to be obvious that a cutter blade for rotary mower constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a rotary grass cutter, the combination which comprises a horizontally disposed plaform having a straight leading edge, transversely disposed forward and rear axles on which the platform is carried, ground engaging wheels mounted on the ends of the axles for supporting the platform, said forward axle being positioned to coincide with the straight leading edge of the platform, a vertically positioned shaft journaled in said platform, a cutter bar having cutting blades on the ends thereof mounted on the lower end of the vertically positioned shaft and positioned to travel in a circular path in a horizontal plane below the platform, said vertically positioned shaft being spaced from the leading straight edge of the platform at such a distance that the circular path of the cutting blades extends beyond said leading edge, said platform having a forward portion extended from the straight leading edge, means hinging said forward portion of the platform to the straight leading edge whereby the forward portion is adapted to, selectively, extend over and beyond the circular path of the cutting blades, or rest upon said horizontally disposed platform to expose the cutting blades for cutting high grass, and means for rotating said vertically positioned shaft and the cutting blades carried thereby.

CLINTON T. COCKLIN.

REFERENCES CITED

The following references are of record in the file of this patent:

UNITED STATES PATENTS

| Number | Name | Date |
|---|---|---|
| 1,190,476 | Smith | July 11, 1916 |
| 1,622,611 | Sera | Mar. 29, 1927 |
| 1,805,927 | Sharp | May 19, 1931 |
| 1,868,347 | Cloud | July 19, 1932 |
| 2,017,524 | Bolens | Oct. 15, 1935 |
| 2,083,103 | Steiner | June 8, 1937 |
| 2,115,265 | Jennett | Apr. 26, 1938 |
| 2,287,126 | Packwood | June 23, 1942 |
| 2,475,716 | Nabors | July 12, 1949 |
| 2,511,124 | Phelps | June 13, 1950 |
| 2,522,112 | Gilmour | Sept. 12, 1950 |